N. DES ROSIER.
WINDOW SHIFTING MECHANISM.
APPLICATION FILED JULY 14, 1920.
1,417,147.
Patented May 23, 1922.
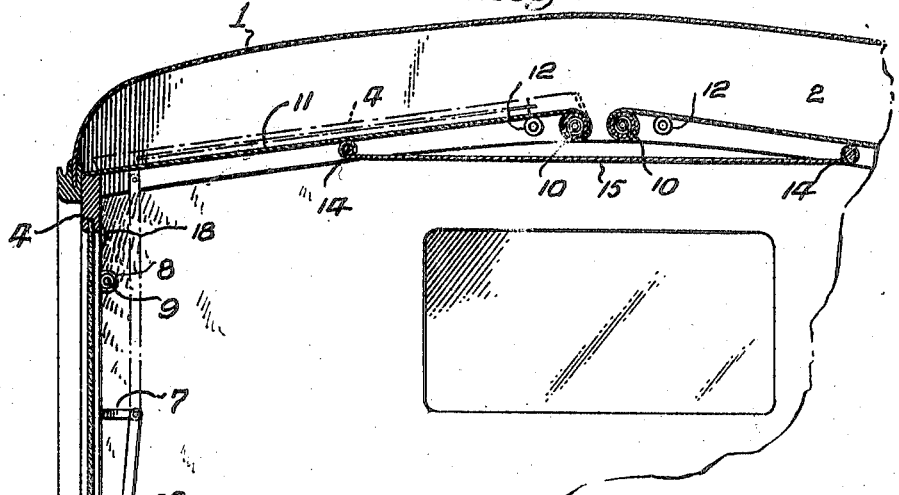
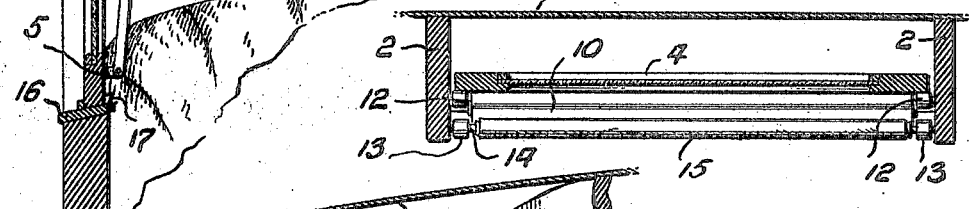
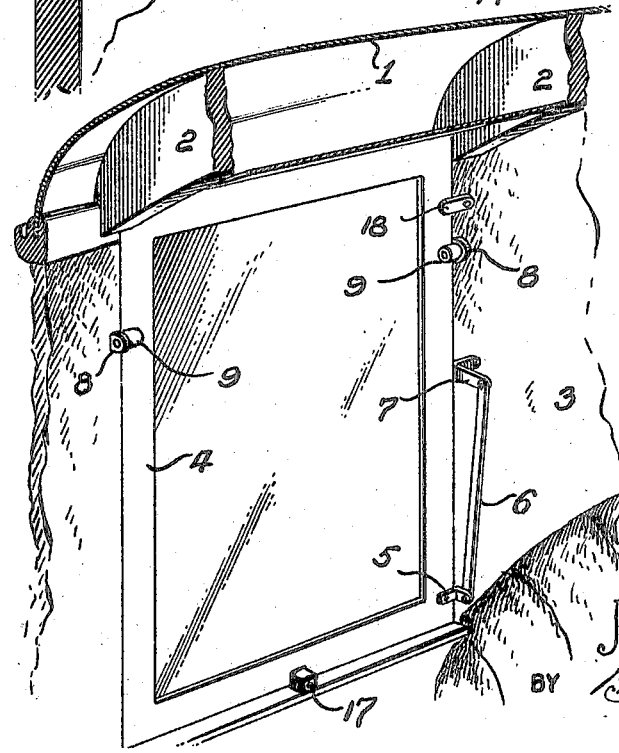
INVENTOR
NARCISSE DES ROSIER
BY
ATTORNEYS

UNITED STATES PATENT OFFICE.

NARCISSE DES ROSIER, OF DETROIT, MICHIGAN.

WINDOW-SHIFTING MECHANISM.

1,417,147. Specification of Letters Patent. Patented May 23, 1922.

Application filed July 14, 1920. Serial No. 396,162.

*To all whom it may concern:*

Be it known that I, NARCISSE DES ROSIER, a citizen of the United States of America, residing at Detroit, in the county of Wayne and State of Michigan, have invented certain new and useful Improvements in Window-Shifting Mechanism, of which the following is a specification, reference being had therein to the accompanying drawings.

This invention relates to a window shifting mechanism and has special reference to the windows of a vehicle top wherein sashes or panels are arranged to be raised or lowered to insure ventilation and comfort within the vehicle. As an example of such a vehicle top there may be mentioned closed body automobiles and those canopy tops which are convertible for winter use.

My invention aims to provide simple and effective means for raising a side sash in proximity to the canopy or roof of an automobile top, so that the same will be out of the road and in position for instant use when the elements are to be excluded from a top. To this end, I provide novel supports for sashes and attach spring actuated members to the sashes for raising or shifting the sashes when released, and the supports cause the sashes to move in predetermined ways to avoid interference with the occupants of an automobile and permit of the sashes being safely placed in inactive and partially concealed positions in the automobile top.

My invention is applicable to the closed body of an automobile or any automobile top having side walls provided with sashes or panels, and the shifting mechanism as applied to a conventional form of top will be hereinafter described and then claimed.

Reference will now be had to the drawings, wherein—

Figure 1 is a cross sectional view of a portion of an automobile top provided with a sash shifting mechanism;

Fig. 2 is a longitudinal sectional view of a portion of the same, and

Fig. 3 is a perspective view of the sash.

The reference numeral 1 denotes the roof or canopy of an automobile top and this roof of canopy is ordinarily supported by bows or transverse members 2 from the side walls 3 of the top. The top ordinarily has window frames or doorways and it is in the window frames and the upper portions of the doorways that shiftable window sashes or panels are placed, and a sash or panel in accordance with my invention has been designated 4. The side of the sash 4 is provided with a bracket 5 at its lower edge and this bracket is pivotally connected by a link 6 to an inwardly projecting bracket 7, carried by the side wall 3 of the top, the elements 5 to 7 inclusive constituting a sash support which defines, to a certain extent, the movement of the sash.

The side wall 3 of the top has inwardly projecting brackets 8 for rollers 9 which cooperate with the sash support in defining the movement of said sash. The rollers 9 are adjacent the upper edge of the side wall 3 and constitute fulcrum points for the side rails of the sash when the lower end of the sash is swung outwardly so that it may be shifted upwardly between the bows or members 2 under the canopy or roof 1.

Connecting the bows or transverse members 2, intermediate the ends thereof, is a conventional form of spring actuated roller 10, somewhat similar to a curtain shade roller, and attached to and wound on the ends of this roller are flexible sash members 11, preferably made of tape which may evenly and easily wind on the roller 10. The sash members 11 are attached to the upper edge of the sash 4 and extend over anti-frictional sash supporting rolls 12 and 23, the latter being on a rod 14 connecting the bows or members 2 and the former supported by said bows or members 2 adjacent the roller 10. The rod 14 will cooperate with a similar rod, at the opposite side of the top, in supporting a panel or sash housing 15 in the automobile top and it is this panel or housing which partially conceals opposed sashes when raised and in inactive positions.

With the sash 4 lowered to rest on the upper edge of the door or window sill 16, it is held at its lower edge by a suitable catch 17, and it may be further held from rattling or becoming accidentally displaced by retaining members or catches 18 carried by the side wall 3 at a point above the fulcrum rolls 9 of the sash. When these catches are swung to inactive position and the catch 17 released the spring actuated roller 10 becomes active and pulls inwardly upon the upper edge of the window sash. As the sash bears on the rollers 9 said rollers will serve as a fulcrum causing the lower end of the sash to swing outwardly while being shifted upwardly. Its outward and upward movement is limited by the support link 6 which also swings outwardly and upwardly and eventually reaches the position shown by dot and dash lines in Fig. 1, and there cooperates with the rolls 12 and 13 in supporting the sash 4, which has been shown in a raised position in Fig. 2.

To lower the sash it is only necessary to reach upwardly and grip the lower rail of the sash and lower it towards the sill 16, said sash moving in the same path as it did when being raised.

It is obvious that two of the link supports 6 can be used in connection with a single sash and a single sash member or tape in lieu of two members, also that the side wall 3 of the automobile top may be constructed to afford a window frame for the sash and a connection therewith which will exclude the elements.

As pointed out in the beginning the shifting mechanism may have its pieces of hardware designed for an ordinary gypsy or canopy top automobile, and while in the drawing there is illustrated a preferred embodiment of my invention, it is to be understood that the structural elements are susceptible to such variations and modifications as fall within the scope of the appended claim.

What I claim is:—

In a vehicle top having a side wall provided with a rigid shiftable sash, a support carried by the top side wall and attached to the lower end of said sash and adapted to cause the lower end thereof to swing outwardly when said sash is raised, flexible sash raising means in the upper part of the vehicle top attached to the upper edge of the sash and effective for raising the sash when the end of said sash is swung outwardly, and means including rolls carried by the top side wall and against which rolls the inner side of said sash bears and fulcrums during the raising action of the sash so that said sash is guided and caused to follow said flexible sash raising means and assume substantially a horizontal position in the automobile top.

In testimony whereof I affix my signature in the presence of two witnesses.

NARCISSE DES ROSIER.

Witnesses:
 Anna M. Dorr,
 Karl H. Butler.